United States Patent [19]
Fernandes

[11] Patent Number: 5,671,555
[45] Date of Patent: Sep. 30, 1997

[54] VOICE INTERACTIVE SPORTSCARD

[76] Inventor: Gary L. Fernandes, 16025 Lake Hills Blvd., Bellevue, Wash. 98008

[21] Appl. No.: 385,672

[22] Filed: Feb. 8, 1995

[51] Int. Cl.$^6$ .................................................. G09F 1/00
[52] U.S. Cl. ........................... 40/124.03; 40/455; 369/64; 273/237; 395/2.47
[58] Field of Search ................. 40/124.03, 455, 40/642, 700, 717; 369/63, 64, 69, 70; 273/85 G, 433, 237; 395/2.4, 2.47, 2.55

[56] References Cited

U.S. PATENT DOCUMENTS

| | | | |
|---|---|---|---|
| 3,691,312 | 9/1972 | Petersen | 40/455 X |
| 4,468,204 | 8/1984 | Scott et al. | 434/309 |
| 4,791,741 | 12/1988 | Kondo | 40/124.1 X |
| 4,852,172 | 7/1989 | Taguchi | 395/2.4 X |
| 4,866,865 | 9/1989 | Yang | 40/455 |
| 5,275,285 | 1/1994 | Clegg | 40/124.1 |
| 5,309,547 | 5/1994 | Niyada et al. | 395/2 X |
| 5,365,686 | 11/1994 | Scott | 40/455 |
| 5,433,035 | 7/1995 | Bauer | 40/124.1 |
| 5,452,274 | 9/1995 | Thompson | 40/455 X |
| 5,480,156 | 1/1996 | Doederlein et al. | 40/455 X |

FOREIGN PATENT DOCUMENTS

| | | | |
|---|---|---|---|
| 2155858 | 10/1985 | United Kingdom | 40/455 |

OTHER PUBLICATIONS

Sensory Circuits, Inc. Specification of Model #RSC-164 "A Single Chip Solution for Speech Recognition, Voice/Sound Output and Product Control." (1995).

Sensory Circuits, Inc. Specification of Model #RSC-264, "A Single Chip Solution for Speech Recognition, Voice/Sound Output, and Product Control" (1995).

OKI Semiconductor, Catalog Pages, "MSM6679 Voice Recognition Processor", (Admitted Prior Art).

Namiki Precision Jewel Co. Ltd., Specification of Model #7CE-170IWL-00 "Coreless DC Motor for Use in Vibration Pager" (1991).

*Primary Examiner*—Peter M. Cuomo
*Assistant Examiner*—James O. Hansen
*Attorney, Agent, or Firm*—Dean A. Craine

[57] ABSTRACT

A voice interactive sportscard, which through the use of an electronic microchip speech recognition, synthesis, and control processing device, actively draws the attention of the user by generating an interactive and changing conversation with the user, or the user may participate and be in audience between a set of voice interactive sportscards having their own group conversation. Generate physical interaction with the user by the use of a micro-vibrator and protect the voice interactive sportscard artwork from wear by the use of a non-mechanical touch sensitive activation/mode switch.

2 Claims, 2 Drawing Sheets

VOICE INTERACTIVE SPORTSCARD

FIELD OF THE INVENTION

This invention relates to sportscards and, in particular embodiment, a voice interactive sportscard which generates a voice interactive conversation by means of speech recognition when activated by a non-mechanical touch sensitive switch, micro-vibrator for physical interaction and a support body structure to protect the voice interactive sportscard artwork covers.

BACKGROUND OF THE INVENTION

Traditionally, a sportscard, such as baseball cards, football cards and basketball cards, comprises of printed pictorial, graphic and text artwork 2½" by 3½" of a athlete on the front cover artwork and that athlete's sport statistics on the back cover artwork. Between the front and rear cover artwork there is a thin layer of cardboard. Sportscards are used as collectable membrabilia. Drawbacks of this sportscard, are that the owner of the sportscard may have little or losing interest in simple reading the sportscard and the sportscard is subject to damage, particularly to the corners and edges due to the flimsy structure, inherently reducing the collectable value of the sportscard. Generally, the very slightest of wear, dent, or like damage, to a sportscard reduces the collectable value of that sportscard.

In a different and unrelated field of products greeting cards have been produced with sound emitting microchip devices to enhance interest activated by a mechanical spring switch mechanism. The greeting cards often provide a musical accompaniment, when opened. This accompaniment typically follows the words in the greeting card or fits the mood of that particular type of greeting card. In some greeting cards, the owner of the greeting card records their own message, from which the recipient can play back the message. The greeting cards being a record then playback or simple playback type provide no means for speech recognition, preventing the user from having a voice interactive conversation, limiting their usefulness and interest. Activation by means of applying force and presser to a mechanical spring switch mechanism commonly adds wear and long term permanent damage to artwork covers that are applied.

Their is a strong desire from sportscard collectors and fans for a sportscard with features of speech recognition, with which through the use of speech recognition a interactive and changing conversation may be generated between the voice interactive sportscard(v-i-sportscard) user and the athlete figure commonly pictured on the front cover artwork of the v-i-sportscard, or participate and be in audience between a set of v-i-sportcards having their own group conversation. Generate physical interaction through the use of a micro-vibrator and provide the means to protect the v-i-sportscard artwork covers from damage due to handling and activation. A touch sensitive activation switch activates without the force and presser required by a mechanical spring switch mechanism, thereby protecting the v-i-sportscard artwork covers from wear and damage which is critical to the collectable value of the v-i-sportscard.

SUMMARY OF THE DISCLOSURE

The purpose of this invention is to provide a voice interactive sportscard(v-i-sportscard) with which the user can participate in a interactive and changing conversations with the v-i-sportscard.

The second purpose of this invention is to allow the v-i-sportscard user to participate or be in audience to a group of v-i-sportscards having their own interactive and changing conversation.

The third purpose of this invention is to physically interact with the user with the use of a micro-vibrator.

The fourth purpose of the invention is to protect the v-i-sportscard front and rear cover artwork from wear or damage.

In particular embodiments the new type of sportscard actively draws greater attention and commonly adds more collectable value.

To accomplish the above purposes, the v-i-sportscard of this invention comprises the followings: (1) means for generating a voice interactive conversation comprising an electronic microchip speech recognition, synthesis, and control processing device including a microphone and speaker; (2) means for activation without causing wear or damage to the sportscard front and rear cover artwork and generate a mode selection comprising a touch sensitive switch; (3) means for physical interaction with the holder by use of a micro-vibrator; and (4) a support body structure protecting the sportscard artwork covers and on which each means are mounted.

The unique feature of speech recognition processing of a v-i-sportscard, permits the v-i-sportscard to distinguish and respond to the user's own words. For example, a v-i-sportscard when activated may ask a question, such as "So what team do you favor?", then listen and recognize the response and dependent on that response, the v-i-sportscard may have several of it's own responses. If the response to the question was the team "Redskins" the v-i-sportscard may have responded with "Oh!, They are always a tough team to play against, Lets listen to highlights of a few games I played against them . . . ". Or if the response to the question was instead "New York Redskins", the v-i-sportscard having identified that their is not a team called the New York Redskins, may have had a different response such as "Your confusing me buddy! There is no such team. You must mean either the Washington Redskins or New York Giants? . . . ". Another example; a v-i-sportscard asking a question "Hi my name is Larry Birst. You know what I think is the most important part of Basketball?". Then dependent on the response from the user, such as, "Shooting", "Rebounds", "I don't know", etc., the conversation and topic could change. And the conversation format could continue best in the style and personality of the actual athlete that has their printed photo on the front cover artwork. A v-i-sportscard user being a child or adult having a conversation with their favorite sports idol, such as Michael Jordan, Joe Montana or Wayne Grezsky for instance, would provide a degree of enjoyment not yet attained today in industry.

The unique feature of speech recognition processing of a v-i-sportscard, permits the v-i-sportscard to distinguish and respond to another v-i-sportscard's own words. Two or more v-i-sportscard could be activated together to form a group conversation. For example, a set of five v-i-sportscards could be activated all together in close proximity and generate their own group conversation and interact with the sportscard user as well.

Speech recognition processing may be utilized to create speech recognized special code words to enable/disable a mode of operation. Such as, a set of v-i-sportscards could be prevented from having a group conversation until the complete and proper set of v-i-sportscards are present and the group conversation activated by the speech recognized special code words that are broken up between the set. The entire code spoken by the set could enable the set to proceed with their group conversation. Without the entire code being spoken by the set the group conversation could be disabled. For example, a set of three v-i-sportscards could have the code "N.B.A.". The first v-i-sportscard of the set contains it's part of the code "N". The second v-i-sportscard of the set contains the "B". And the third contains the last part of the code "A". The set of three v-i-sportscards are activated in close proximity and each v-i-sportscard waits for it's two missing codes to be spoken by the other v-i-sportscards of the set. Only after the full code has been spoken and recognized by each v-i-sportscard can the group conversation proceed.

A v-i-sportscard user being a child or adult participating or being audience to conversations going on between their favorite sports idols would provide a degree of enjoyment not yet attained today in industry. The use of speech recognized codes between a set of v-i-sportscards may motivate v-i-sportscard collectors to purchase full sets of v-i-sportscards.

The v-i-sportscard is activated by a momentary touch to the non-mechanical touch sensitive switch and remains activated until the interactive conversation has ended. The touch sensitive switch after activation may be used as input to set a mode of operation (mode selection signal). As example, if the v-i-sportscard receives a constant touch, such as being held, the v-i-sportscard could respond with a conversation mode directed at the holder. However if v-i-sportscard has been activated by only a momentary touch, and is not being held, the v-i-sportscard could respond with a conversation mode directed at a group or set of other v-i-sportscards. The use of a special code word spoken by the user immediately after activation could also be used to activate a mode of operation.

The feature of a micro-vibrator could be synchronized with the voice and audio output to generate a physical jolt or vibration to the v-i-sportscard, for example, at the time a baseball hits a bat or when their is a big football tackle giving the v-i-sportscard greater involvement with the holder.

Other features and advantages of the invention will become apparent from the following detailed description, taken in conjunction with the accompanying drawings which illustrate, by way of example, various features of embodiments of the invention.

DETAILED DESCRIPTION OF THE DISCLOSURE

Figure 1:
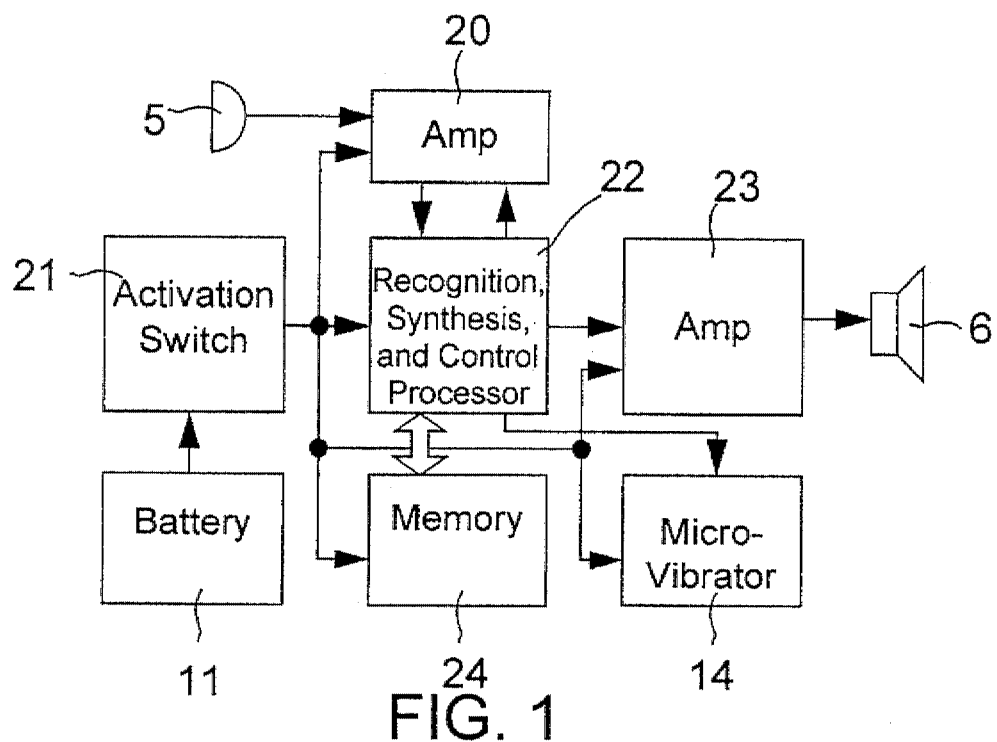
FIG. 1 is a simple block diagram illustrating the construction.
Figure 2:
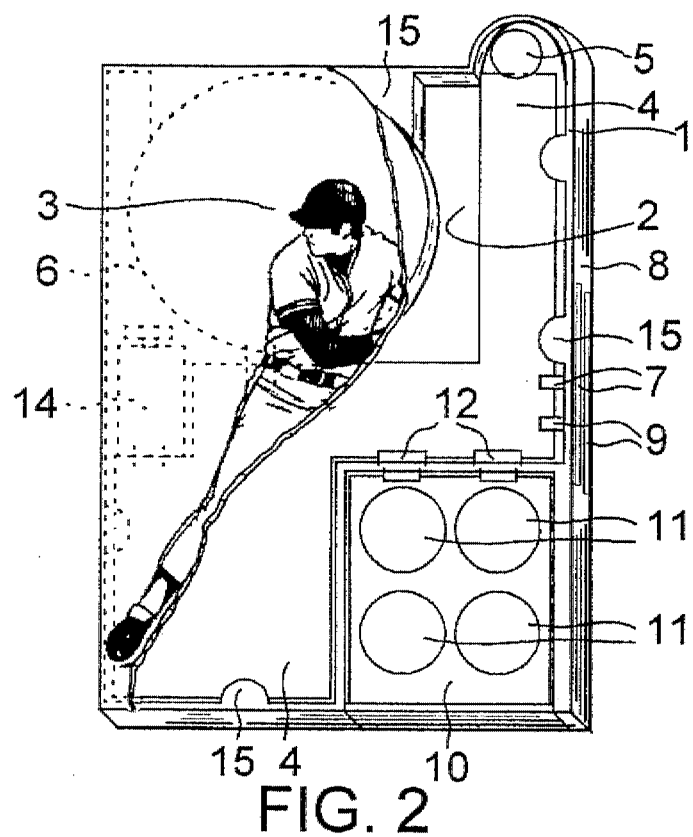
FIG. 2 is a angled front view of an voice interactive sportscard with a partially broken front view.

Shown in FIG. 2 a example v-i-sportscard front cover artwork 3, shown partially broken, mounted on support body structure 1. The front cover artwork 3 and rear cover artwork (not shown) comprise of printed pictorial, graphic and text artwork relating to the general theme of the v-i-sportscard. The support body structure 1 is made of plastic and is formed into the shape of a thin semi-rectangular box with front and rear openings. The support body structure 1 and the front cover artwork 3 and rear cover artwork form a inner cavity 2. A printed circuit board 4, microphone 5, micro-vibrator 14, battery holder 10, and speaker 6 (shown as broken lines) are mounted in the inner cavity 2 attached to the support body structure 1 by mounting locations 15. Batteries 11 are installed on a removable battery carrier 10 and connect to the circuit board 4 with connectors 12. Two touch sensitive switch metal sensors pads 7 and 9 are mounted flush with the support body structure surface area 8 and connect to the printed circuit board 4.

Figure 3:
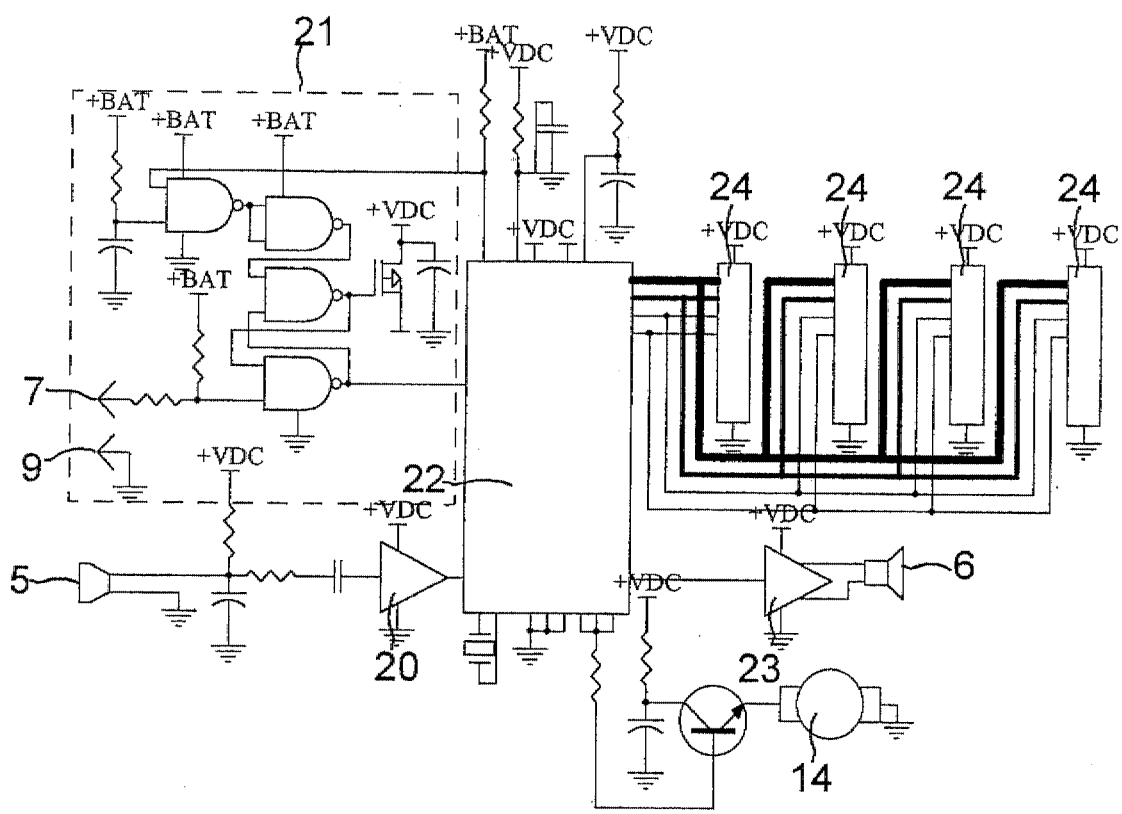
FIG. 3 is a electronic microchip speech recognition, synthesis, and control processing device example diagram.

FIG. 3 is a electronic microchip speech recognition, synthesis, and control processing device. Activation circuit 21 is powered by the battery voltage +BAT and activates the v-i-sportscard by power +Vdc to the remaining circuits and ICs 20, 22–24 upon holding or by momentary touching the touch sensitive sensor pads 7 and 9. IC 22 is a speech recognition, synthesis controller, for example, but not limited to model RSC-X64 produced by Sensory Circuits, Inc. of U.S.A., or model MSM6679 produced by OKI Semiconductor of U.S.A., mounted on circuit board 4. IC 22 monitors the touch sensitive nand-gate output (mode selection signal) circuit 21 in order to identify whether the card is being held constant, has been activated by a momentary touch, or has been activated and touched in a sequence of touches. The manner in which the v-i-sportscard is activated may be used to select a mode of operation. Upon completion of speech recognition and synthesis IC 22 applies signal to circuit 21 to shut down power +Vdc to conserve energy. Optional memory 24 extends the capacity and capabilities of IC 22. Audio input from a microphone 5 and amplified by IC 20 is applied to IC 22. Audio output is amplified by IC 23 and applied to speaker 6. Micro-vibrator 14, is a vibration motor model 7CE-1701WL-00 or 6CE-1501WL-00 produced by Namiki Precision of America. Inc. of U.S.A., is activated by IC 22 circuit to generate a physical jolt or vibration to the holder.

This invention is not limited to the above embodiment and can be implemented by the following various physical configurations.

(a) Artwork and writing may be of raised lettering/ graphics, holographic or an image with reflective coating which give an apparent three-dimensional quality.

(b) LEDs or LCD displays may be added to add more features.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

I claim:

1. A voice interactive sportscard for generating a voice interactive conversation and physical interaction between the user and the voice interactive sportscard comprising:

(a) a support body structure including printed pictorial, graphic and text front and rear cover artwork forming an inner cavity;

(b) an electronic microchip speech recognition, synthesis, and control processing device including a microphone and speaker to generate a voice interactive conversation incorporated into the inner cavity, and;

(d) a touch sensitive activation switch.

2. A voice interactive sportscard, as recited in claim 1, further including a micro-vibrator to generate physical interaction incorporated into the inner cavity.

* * * * *